March 23, 1971  H. J. GERBER ET AL  3,572,202
SHEET MATERIAL CUTTER WITH PRESSER PLATE
UTILIZING PRESSURIZED AIR
Original Filed May 5, 1969  3 Sheets-Sheet 1

INVENTORS
HEINZ JOSEPH GERBER
DAVID R. PEARL

McCormick, Paulding & Huber

ATTORNEYS

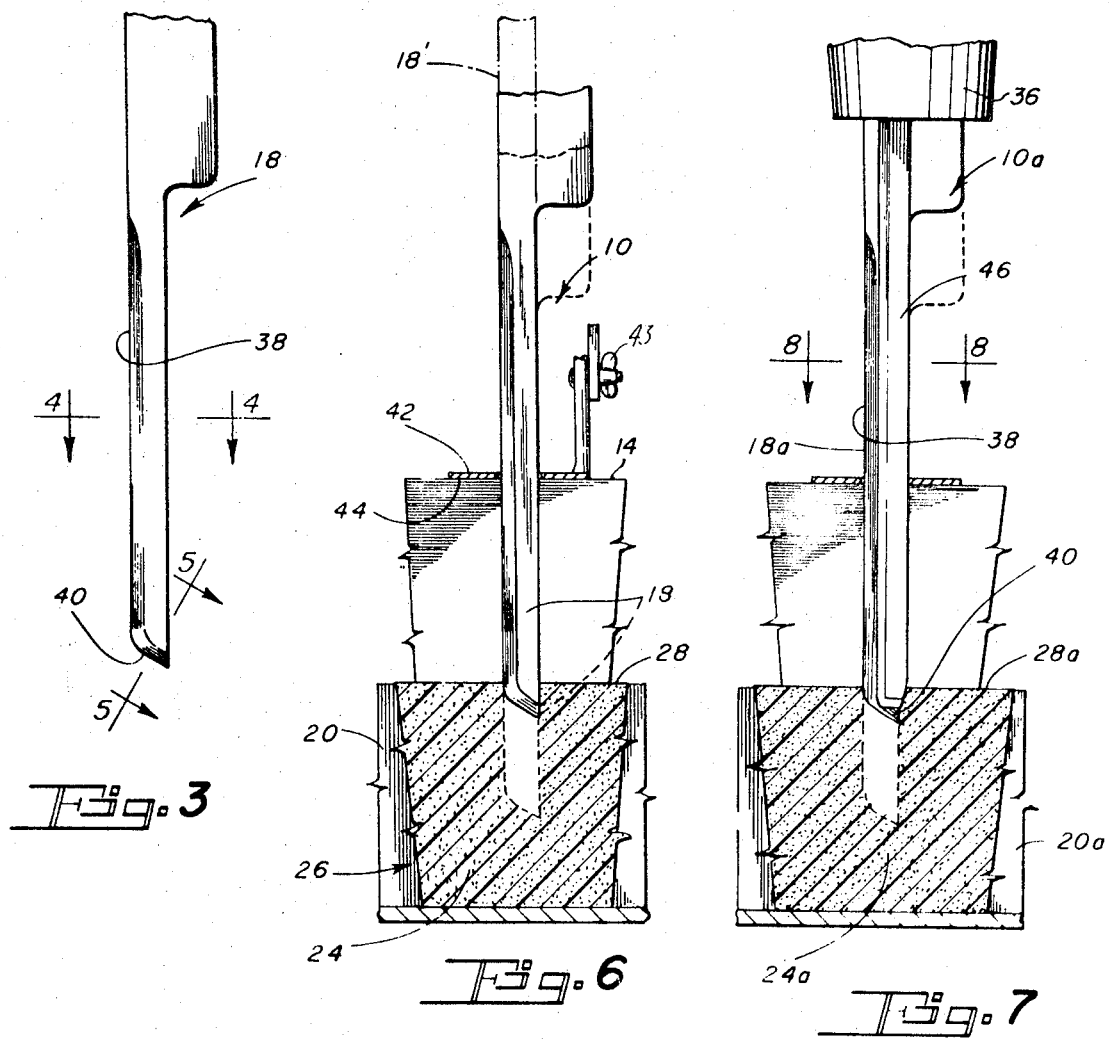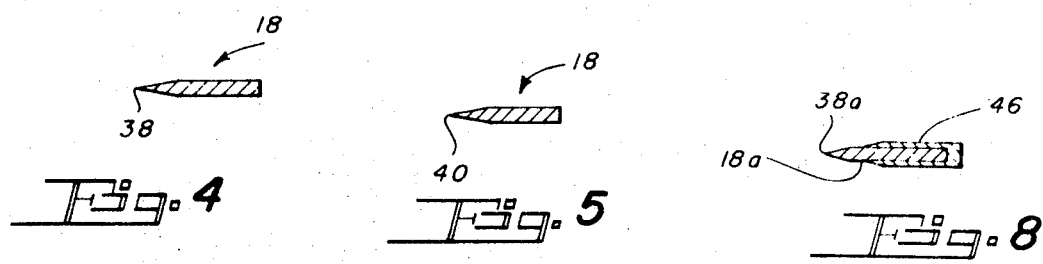

March 23, 1971  H. J. GERBER ET AL  3,572,202
SHEET MATERIAL CUTTER WITH PRESSER PLATE
UTILIZING PRESSURIZED AIR
Original Filed May 5, 1969  3 Sheets-Sheet 3

INVENTORS
HEINZ JOSEPH GERBER
DAVID R. PEARL

McCormick, Paulding & Huber

ATTORNEYS

United States Patent Office 3,572,202
Patented Mar. 23, 1971

3,572,202
SHEET MATERIAL CUTTER WITH PRESSER PLATE UTILIZING PRESSURIZED AIR
Heinz Joseph Gerber and David R. Pearl, West Hartford, Conn., assignors to Gerber Garment Technology, East Hartford, Conn.
Original application May 5, 1969, Ser. No. 821,723. Divided and this application Mar. 26, 1970, Ser. No. 22,905
Int. Cl. B26d 1/10
U.S. Cl. 83—146                                    2 Claims

ABSTRACT OF THE DISCLOSURE

Apparatus for cutting sheet material includes a cutting table having a material supporting surface and a cutter movable in the plane of such surface and having a blade engageable with the material spread thereon to cut such material as it is moved along a desired line of cut. A presser plate or foot located adjacent the blade applies a pressing force to the material at the cutting zone and includes openings facing the material from which pressurized air is emitted to exert a greater force on the material and/or to form an air cushion between the presser foot and the material to reduce friction.

CROSS-REFERENCE TO RELATED APPLICATION

This application is a division of pending application Ser. No. 821,723, filed May 5, 1961, for Apparatus for Cutting Sheet Material.

BACKGROUND OF THE INVENTION

This invention relates generally to sheet material cutting apparatus, and deals more particularly with an improved apparatus particularly well adapted for cutting garment components or the like from either a layup of sheets arranged in vertically stacked relationship or a single sheet which is spread out in a generally flat condition prior to the cutting operation.

Still more particularly this invention relates to an improved means, in apparatus of the aforedescribed character, for applying a pressing or holding force at the cutting zone to the material to be cut.

SUMMARY OF THE INVENTION

The present invention resides in a means providing a supporting surface for supporting a layup or a single sheet of material to be cut, a cutter with a cutting tool, means for moving the cutter and support means relative to one another to allow the cutting tool to follow any line on the material to be cut, and a pressure plate or foot adjacent the tool for applying a pressing force to the material at the cutting zone, the presser foot including one or more openings, facing the material, through which pressurized air is ejected. The cutting tool passes through the material and may penetrate the supporting surface, the supporting surface in this case being formed by a bed of penetrable material.

BRIEF DESCRIPTION OF THE DRAWINGS

FIG. 3 is a side elevational view of the blade of the cutting apparatus of FIG. 1.
FIG. 4 is a sectional view taken along the line 4—4 of FIG. 3.
FIG. 5 is a sectional view taken along the line 5—5 of FIG. 3.
FIG. 6 is a somewhat enlarged side elevational view of the apparatus of FIG. 1, shown partially in section.
FIG. 7 is generally similar to FIG. 6, but shows another sheet material cutting apparatus.
FIG. 8 is a sectional view taken along the line 8—8 of FIG. 7.

DETAILED DESCRIPTION OF THE PREFERRED EMBODIMENTS

Figure 1:
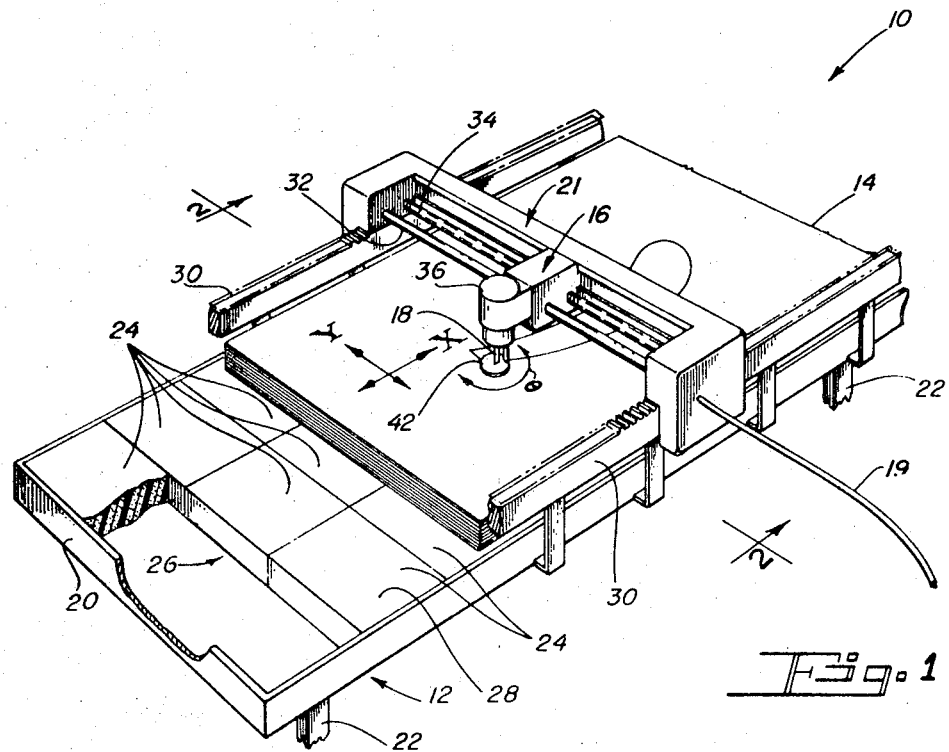
FIG. 1 is a fragmentary perspective view of a sheet material cutting apparatus.
Figure 2:
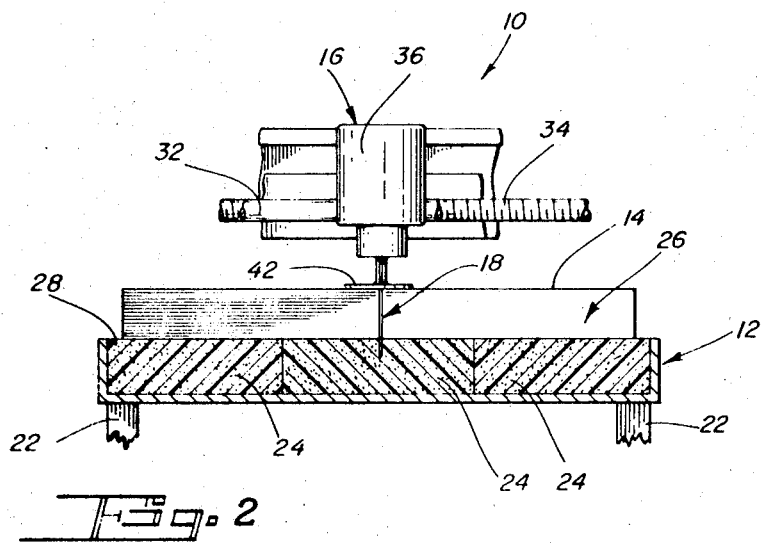
FIG. 2 is a somewhat enlarged fragmentary sectional view taken along the line 2—2 of FIG. 1.

Turning now to the drawings in greater detail, and first considering FIGS. 1 to 6, a sheet material or fabric cutting apparatus 10 is shown in FIG. 1 as having a table indicated generally at 12 providing support for a fabric layup 14 comprising a plurality of fabric sheets arranged in vertically stacked relation. A carriage indicated generally at 16 is supported by the table for traversing the surface thereof in two coordinate directions as indicated by the arrows X and Y. The apparatus also includes a cutter 36, having a cutting tool in the form of a blade 18, mounted on the carriage 16 so that it can be driven to and from any predetermined point relative to the table surface in response to positioning signals supplied to the apparatus through the cable 19 by an associated input means such as, for example, a numerically controlled controller or a computer (not shown). The carriage is capable of moving the blade 18 in cutting engagement with the layup 14 along any line which may be straight or curved as required in cutting a garment component or the like. The blade 18 has a reciprocating cutting stroke and is further arranged for rotation about its own axis in a direction indicated by the arrow θ in response to signals from the input means. During at least a portion of its stroke, the blade 18 penetrates the upper supporting surface 28 of the table 12 as hereinafter described in more detail.

The table may be constructed from various materials and may take a variety of forms, and in the drawings and description which follows various preferred table forms are illustrated and described. The table 12 of FIGS. 1 to 6 includes a container-like frame 20 supported at a convenient working height by a plurality of legs 22, 22. The frame has a bottom wall and side and end walls which extend upwardly from the bottom wall to form a shallow container for receiving a plurality of pieces, or generally rectangular blocks 24, 24, of resilient penetrable plastic material contiguously arranged to form a bed of material indicated generally at 26. Preferably the blocks are made from foamed polyethylene. Ethafoam, a product of Dow Chemical Company, has proven particularly suitable as a bed material. The upper surfaces of the blocks 24, 24 collectively define the substantially continuous planar surface 28 on which the layup 14 is supported.

The carriage 16 may be supported and driven relative to the table in various different ways without departing from the invention. In the illustrated apparatus of FIG. 1, however, the carriage 16 is carried by a larger main carriage, indicated generally at 21 which transversely spans the table 12. Support for the main carriage 21 is provided by a pair of elongated racks 30, 30 mounted on opposite sides of the table 12 and extending longitudinally thereof. The carriage 21 includes a drive shaft (not shown) which also extends transversely of the table and has pinions mounted at its opposite ends for engaging the racks 30, 30 to move the carriage longitudinally of the table, or in the X direction, in response to operation of a drive motor drivingly connected to the shaft. A guide bar or tube 32 and a lead screw 34 also extend transversely of the table and serve to support and drive the carriage 16 transversely of the table, or in the Y direction, in response to the operation of another drive motor drivingly connected with the lead screw 34. The blade 18 extends downwardly from the main body of the cutter 36 and is reciprocated vertically by a motor in the cutter body. It is also rotated in the $\theta$ direction by another motor in the cutter body.

The cutter 36 is mounted on the carriage 16 for vertical movement relative thereto so as to be capable of being raised from the position shown in FIG. 1 to elevate the blade 18 and raise it from its normal cutting position to a position at which it is located entirely out of and above the top of the fabric layup 14. That is, when the cutter 36 is raised, the lower extremity of the blade 18 is positioned above the layup 14 so that the cutter and blade may, if desired, be moved to any preselected position above the layup and then lowered to pierce the layup. Thus, a cut may be started at any desired position on the layup and inwardly of the marginal edges thereof. Further, considering the blade 18, as best shown in FIGS. 3 to 5, it will be noted that it has a cutting edge which extends generally longitudinally along the major portion thereof and terminates at the lower extremity thereof. More particularly, the cutting edge includes a rectilinear portion 38 and an end portion 40 inclined downwardly from the rectilinear portion 38 to the rear edge and lower extremity of the blade, as best shown in FIG. 3. The inclined portion 40 serves to cut the material of the layup as the cutter is lowered from its raised position to its normal cutting position with the blade piercing into the layup as such lowering movement is effected.

Preferably the apparatus 10 also includes a presser plate or foot 42 carried by the motor 36 and arranged for adjustable movement generally toward and away from the surface 28 to accommodate layups of various thickness, as best shown in FIG. 6. A thumb screw 43 releasably retains the presser plate in various desired positions of adjustment. The presser plate 42 has a generally horizontally disposed and downwardly facing bearing surface 44 adapted to press downwardly against the upper surface of the layup 14 as the blade 18 reciprocates through an opening in the presser plate. During at least a portion of its cutting stroke, the blade 18 extends through the surface 28 and penetrates the bed 26. The blade 18 may be adjusted vertically relative to its drive motor 36 to control its depth of penetration.

In FIG. 6, the blade 18 is shown adjusted for the presently preferred form of cutting operation, the solid lines showing the blade in the upper extremity of its stroke and the dotted lines showing the blade in the lower extremity of its stroke. From this figure, it will be noted that the adjustment is such that the blade tip remains buried in the material of the bed 26 at all times during the normal cutting process and at the lower extremity of its stroke extends slightly more than halfway through the bed. This particular adjustment of the blade is not, however, essential and, if desired, the blade may be adjusted so that more or less of the tip remains buried at all times in the bed material or so that the blade penetrates through more or less than half the thickness of the bed material. Also, the adjustment may in some cases be such that the blade tip actually moves above the top surface of the bed material during a portion of its stroke.

The individual blocks 24, 24 which comprise the bed 26 may ultimately be damaged by repeated blade penetration to the point where it no longer adequately supports the layup. When such damage occurs one or more damaged blocks 24, 24 may be removed from the frame 20, overturned and replaced in the frame to expose an undamaged lower side of each block in an upwardly facing position. After both the upper and lower surfaces of a block 24 have become so damaged that the block no longer provides adequate support for the layup 14, the damaged block may be removed from the frame 20 and replaced by a new one. Thus, it is necessary to replace only that portion of the bed which becomes severely damaged to maintain the apparatus in operating condition.

Additional forms of cutting apparatus shown in the drawings and hereinafter further described are similar in many respects to the previously described apparatus 10 of FIGS. 1 to 6. Each part which is substantially identical to a part previously described bears the same reference numeral as the previously described part but includes a letter suffix and will not be hereinafter further discussed. Considering now FIGS. 7 and 8, another apparatus 10a is shown which is similar in most respects to the apparatus 10. The apparatus 10a, however, includes an elongated blade sheath 46 which extends longitudinally of the blade 18a and received an associated portion of the blade therein with the cutting edge of the blade exposed. The sheath 46 is supported at its upper end from the main body of the cutter 36 and in turn provides additional support for the blade 18a which is reciprocally movable therein. Preferably, as shown in FIG. 7, the sheath is so positioned during normal cutting that its lower end slightly penetrates the bed 26.

Figure 9:
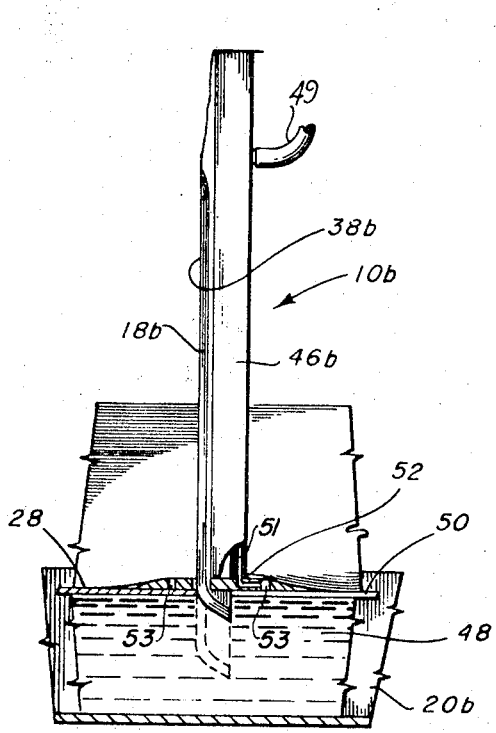
FIG. 9 is generally similar to FIG. 6 but shows another form of sheet material cutting apparatus.
Figure 10:
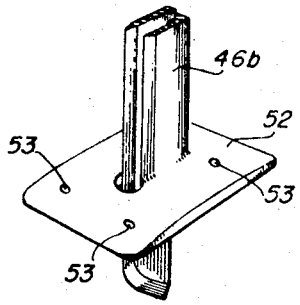
FIG. 10 is a fragmentary perspective view of the apparatus of FIG. 9.

Various other materials besides a foamed plastic such as foamed polyethylene may be used to provide a penetrable supporting bed for the material to be cut and, in some instances, it may be desirable to provide a bed of penetrable material which is substantially immune to damage from repeated blade penetration. Such apparatus is indicated at 10b in FIG. 9 and includes a bed of self-healing or self-repairing material. The bed material indicated at 48 is a superviscous liquid, that is, a liquid which exhibits properties of a solid material. A material of this type marketed under the trade name Silly Putty has been found particularly well suited for the present purpose. A substantially continuous penetrable and planar supporting surface is provided by a sheet of material which rests on the upper surface of the liquid 48. The sheet 50 is preferably paper or like material which may be readily discarded and replaced, as necessary. The sheet 50 may not, however, be needed in some instances, depending on the character of the material being cut, and in such cases may be eliminated with the surface of the bed material 48 therefore directly engaging and forming the immediate supporting surface for the material to be cut. The apparatus 10b also includes a blade sheath 46b which has a bottom plate 52 mounted at its lower end. The horizontally disposed bottom plate 52 resides between the sheet 50 and the layup 14b and provides a convenient device for gauging the vertical adjustment of the drive motor 36 relative to the surface 28 to insure proper penetration of the blade in the bed of material 26. Also, if desired, air under pressure may be conducted through the sheath 46b to the bottom plate 52 and emitted from holes or the like in either its top or bottom surface, or both, to provide an air cushion between the bottom plate and the material being cut and/or between the bottom plate and the supporting surface of the supporting bed to reduce the frictional forces on the bottom plate resisting its movement during a cutting process. For this purpose, as shown in FIGS. 9 and 10, the sheath 46b has an air passageway 51 communicates with air emitting openings nected at its upper end to an air supply conduit 49. This passageway 51 communicates wtih air emitting openings 53, 53 communicating with both the top and bottom surfaces of the illustrated bottom plate 52. The bottom plate 52 is not limited to use with a bed of superviscous material or with a reciprocating cutting tool as shown in FIG. 9, but may be used as well with many other types of bed materials or cutting tools as desired.

While the apparatus 10b has been illustrated and described with reference to a superviscous liquid, it should be understood that other self-healing materials may also be used. For example, a material which contains capsules of a suitable solvent dispersed therein and adapted to rupture upon contact with a blade will possess this essential self-healing characteristic. A cellular material which has a quantity of a suitable solvent entrapped in some or all of its cells and which solvent becomes chemically active to mend or weld an associated break in the material when the cells are ruptured will also be suitable for this purpose.

Figure 11:
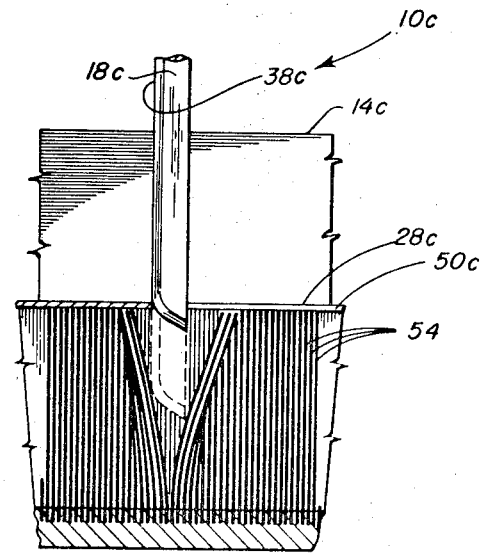
FIG. 11 is generally similar to FIG. 6, but shows still another sheet material cutting apparatus.

In FIG 11, still another cutting apparatus is shown and designated generally at 10c. The apparatus 10c has a bed of penetrable material comprising a plurality of flexible upwardly extending bristles 54, 54. The bristles are arranged in close relation to each other so that in a plane passing transversely of said bristles near their free ends the area occupied by said bristles is greater than the free area surrounding the same. The upper or supporting surface of the table indicated at 28d is defined by a piece of sheet material or paper 50c which overlies the bed surface formed by the free end portions of the bristles 54, 54. Again, however, the sheet 50c may in some instances be eliminated with the upper ends of the bristles 54, 54 in turn collectively defining the supporting surface which immediately contacts the material to be cut.

Figure 12:
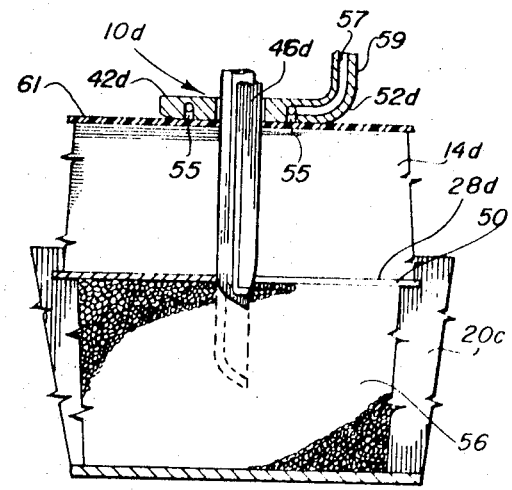
FIG. 12 is generally similar to FIG. 6, and shows a sheet material cutting apparatus embodying the present invention.

Considering now FIG. 12, still another cutting apparatus, indicated generally at 10d, is shown to comprise a table having a frame 20c containing a bed of granular material indicated generally at 56. Sawdust, small balls of metal or plastic, and granules of foamed or unfoamed plastic are examples of granular material which may be used for that shown at 56. A sheet of material or paper 50d overlies the upper surface of the bed defined by the granular material and provides a substantially continuous planar surface for supporting a layup 14.

The appratus 10d of FIG. 12 also includes a presser plate or foot 42d, made in accordance with the present invention, and a blade sheath 46d. The presser plate 42d is adjustable vertically relative to the associated cutter housing and applies a pressure to the top surface of the material being cut in the vicinity of the cutting blade. If desired, and as shown in FIG. 12, the presser plate 42d includes one or more openings 55, 55 in its bottom or pressing surface, that is the surface facing the material to be cut, through which air under pressure is supplied from a passageway 57 passing through its associated supporting stem 59. The air under pressure emitted from the openings 55, 55 applies force to the top surface of the material being cut tending to press it more tightly toward the supporting surface of the bed material. It also forms an air cushion between the presser plate and the top surface of the material to reduce friction therebetween. Further, if desired, a sheet 61a of substantially air impermeable material, such as thin polyethylene film may be spread over the top of the material to be cut so as to reside between the top surface of the presser plate, particularly in cases where the material being cut is relatively porous, this permitting the emitted pressurized air to have greater compressing effect on the material being cut. It will of course be understood the presser plate of this invention, as exemplified by the plate 42d of FIG. 12, may be applied to various different forms of cutting apparatus other than that of FIG. 12 and may, for example, be used with the other forms of cutting apparatus shown by FIGS. 1 to 11 if desired.

We claim:

1. An apparatus for cutting sheet material comprising means defining a supporting surface for supporting sheet material to be cut which sheet material is spread thereover, a cutter, means for moving said cutter and said supporting surface relative to one another along a given line of cut, said cutter including a cutting tool, and a presser plate located near said cutting tool and having a pressing surface facing the exposed surface of said material to be cut for applying pressing force to said material in the vicinity of said tool, said presser plate having at least one opening in said pressing surface, a sheet of substantially air impervious material overlying said material to be cut and positioned between said material to be cut and said pressing surface of said presser plate, and means for conducting air under pressure to said opening so as to cause the air emitted therefrom to urge said sheet of substantially air impervious material and said material to be cut toward said supporting surface.

2. An apparatus for cutting sheet material comprising means defining a supporting surface for supporting sheet material to be cut which sheet material is spread thereover, a cutter, and means for moving said cutter and said supporting surface relative to one another in two coordinate directions in the plane of said supporting surface, said cutter including a cutting tool which during normal cutting of sheet material spread over said supporting surface passes through said sheet material, said cutter including a presser plate located near said cutting tool for applying a pressing force to said latter material in the vicinity of said tool and having a pressing surface facing the exposed surface of said material to be cut, said presser plate having at least one opening in said pressing surface, a sheet of substantially air-impervious material overlying said material to be cut and positioned between said material to be cut and said pressing surface of said presser plate, and means for conducting air under pressure to said at least one opening so as to cause the air emitted therefrom to urge said sheet of substantially air-impervious material and said material to be cut toward said supporting surface.

References Cited

UNITED STATES PATENTS

| | | | |
|---|---|---|---|
| 245,150 | 8/1881 | Fowler | 30—275 |
| 1,172,058 | 2/1916 | Scheyer | 83—561X |
| 2,684,530 | 7/1954 | Weinberg. | |
| 3,304,820 | 2/1967 | Muller et al. | |
| 3,357,386 | 12/1967 | Kalman | 112—235 |

JAMES M. MEISTER, Primary Examiner

U.S. Cl. X.R.

30—275; 83—422, 561, 925 CC

PO-1050
(5/69)

UNITED STATES PATENT OFFICE
CERTIFICATE OF CORRECTION

Patent No. 3,572,202  Dated March 23, 1971

Inventor(s) Heinz Joseph Gerber and David R. Pearl

It is certified that error appears in the above-identified patent and that said Letters Patent are hereby corrected as shown below:

Col. 1, line 32, "1961" should be --1969--.

Col. 4, lines 67 and 68, following "51", delete "communicates with air emitting openings nected and substitute --extending through its rear portion and connected--.

Col. 4, line 69, "wtih" should be --with--.

Signed and sealed this 13th day of July 1971.

(SEAL)
Attest:

EDWARD M. FLETCHER, JR.
Attesting Officer

WILLIAM E. SCHUYLER, JR.
Commissioner of Patents